US007680583B2

(12) United States Patent
McKay et al.

(10) Patent No.: US 7,680,583 B2
(45) Date of Patent: Mar. 16, 2010

(54) METHOD FOR LOW AND HIGH IMEP CYLINDER IDENTIFICATION FOR CYLINDER BALANCING

(75) Inventors: Daniel L. McKay, Brighton, MI (US); Gerard W. Malaczynski, Bloomfield Hills, MI (US); Joshua J. Titus, Ann Arbor, MI (US)

(73) Assignee: Delphi Technologies, Inc., Troy, MI (US)

( * ) Notice: Subject to any disclaimer, the term of this patent is extended or adjusted under 35 U.S.C. 154(b) by 148 days.

(21) Appl. No.: 12/101,450

(22) Filed: Apr. 11, 2008

(65) Prior Publication Data

US 2009/0259382 A1 Oct. 15, 2009

(51) Int. Cl.
*F02D 45/00* (2006.01)
*G06F 19/00* (2006.01)

(52) U.S. Cl. ..................................................... 701/104

(58) Field of Classification Search ................. 701/104, 701/102, 110, 111, 114; 123/435, 436
See application file for complete search history.

(56) References Cited

U.S. PATENT DOCUMENTS 6,006,155 A 12/1999 Wu et al.
7,290,523 B2 * 11/2007 Castagne et al. ............ 123/305

OTHER PUBLICATIONS

U.S. Appl. No. 11/973,099, filed Oct. 5, 2007 entitled "Method for Determination of Covariance of Indicated Mean Effective Pressure From Crankshaft Misfire Acceleration".

Sae Technical Paper Series 2000-01-0932, "Cylinder-Pressure-Based Engine Control Using Pressure-Ratio-Management and Low-Cost Non-Intrusive Cylinder Pressure Sensors," Mark C. Sellnau, Frederic A. Matekunas, Paul A. Battiston, Chen-Fang Chang, David R. Lancaster, Mar. 6-9, 2000.

Introduction to IC Engines, Engine Cycles, The 4-Stroke Cycle, MECH 578, p. 1-11, M.H. Davy, Jan. 10, 2006.

* cited by examiner

*Primary Examiner*—Hieu T Vo
(74) *Attorney, Agent, or Firm*—Thomas N. Twomey

(57) ABSTRACT

A system and method for identifying the cylinders having the lowest ("weakest") and highest ("strongest") Indicated Mean Effective Pressure (IMEP) utilizes engine speed derivative and/or higher order derivative values typically available in an engine control module by virtue of the need to detect misfire. A delta parameter is calculated that is indicative of the difference between the engine speed derivatives and/or higher order derivatives for the "weakest" and the "strongest" cylinders. Control action is then taken to balance the cylinders, based on the delta parameter, by first increasing torque for the "weakest" cylinder, by at least one increasing spark advance, increasing fuel, decreasing dilution (EGR) or slowing decay of fuel control on cold start. Once the weakest cylinder has been balanced, the control action is then directed to increasing torque of the new "weakest" cylinder.

14 Claims, 3 Drawing Sheets

METHOD FOR LOW AND HIGH IMEP CYLINDER IDENTIFICATION FOR CYLINDER BALANCING

TECHNICAL FIELD

The present invention relates generally to a method for low and high indicated mean effective pressure (IMEP) cylinder identification to enable fuel/spark or other control for cylinder balancing.

BACKGROUND OF THE INVENTION

A misfire condition in an internal combustion engine results from either a lack of combustion of the air/fuel mixture, sometimes called a total misfire, or an instability during combustion, sometimes referred to as a partial misfire. In such case, torque production attributable to the misfiring cylinder decreases, due to, among other things, a reduced level of combustion (i.e., manifested by a reduced Indicated Mean Effective Pressure (IMEP)). Additionally, un-combusted fuel enters the exhaust system, which is undesirable. Because of the possible impact on the ability to meet certain emission requirements, engine misfire detection is routinely provided on automotive vehicles. Most common approaches use various engine speed derivatives (e.g., crankshaft acceleration) to detect fluctuations attributable to one or more cylinders, and thus to detect misfire and to identify what cylinder or cylinders have misfired. Accordingly, most internal combustion engine systems already have such engine speed derivative data stored and available by virtue of the need to detect misfire.

While cylinder imbalance may be the result of misfire in a particular cylinder, there is also recognized an inherent cylinder-to-cylinder IMEP variation attributed to manufacturing and durability variations in the base engine and engine control hardware. Whatever the source, a level of cylinder imbalance can be measured by a so-called COVIMEP parameter (i.e., Covariance of Indicated Mean Effective Pressure), as seen by reference to co-pending U.S. application Ser. No. 11/973,099 filed Oct. 5, 2007 entitled "METHOD FOR DETERMINATION OF COVARIANCE OF INDICATED MEAN EFFECTIVE PRESSURE FROM CRANKSHAFT MISFIRE ACCELERATION", assigned to the common assignee of the present invention and hereby incorporated by reference. U.S. application Ser. No. 11/973,099 in turn teaches a method for inferring COVIMEP from various misfire-originated engine speed derivatives. However, to effect improvement in the COVIMEP performance, it is desirable to identify which cylinder is the weakest (lowest IMEP) and which is the strongest (highest IMEP) so that one or more various control actions can be taken to reduce the variation or imbalance between the cylinders.

There is therefore a need for a system and method for low and high IMEP cylinder identification so as to allow for cylinder balancing.

SUMMARY OF THE INVENTION

One advantage of the invention is that enables control action by an engine controller or the like so as to reduce cylinder torque imbalance. The invention, in a preferred embodiment, takes advantage of the fact that engine speed derivative data (e.g., crankshaft speed or acceleration fluctuation data), used in the invention, is already available in most internal combustion engine systems by virtue of the need to detect misfire, as described in the Background. A method for operating a multi-cylinder internal combustion engine system includes a number of steps. The first step involves providing an input array including an engine speed derivative for each cylinder of the engine. As used herein, engine speed derivative simply means a value derived from engine speed indicative data, and is not meant to be limited to only the first order mathematical derivative of engine speed (i.e., acceleration), although the term engine speed derivative includes this meaning. Engine speed derivative thus also includes not only the second order mathematical derivative (i.e., jerk acceleration), but also could include still higher order mathematical derivatives as well, as well as other parameter values derived from engine speed data. Next, identifying (i) a first one of the cylinders that has the lowest Indicated Mean Effect Pressure (IMEP) ("weakest" cylinder), and (ii) a second one of the cylinders that has the highest IMEP ("strongest" cylinder), all based on the information in the input array. The next step involves determining a delta parameter indicative of a difference between the engine speed derivative values for the first and second cylinders. This is significant since the "strongest" cylinder usually follows the "weakest" cylinder in the firing order, since, by comparison to a "weak" cylinder, the recovery back to "normal" is perceived as decisive acceleration, thus, even a normal cylinder will be perceived as strong. This is referred to herein as the shadow effect. The final step involves, in a preferred embodiment, controlling the torque of the first, lowest IMEP ("weakest") cylinder based on the delta parameter so as to reduce the difference between the weakest and strongest cylinders. In a further, preferred embodiment, the control action is continued until it is no longer the "weakest" cylinder. Then, any remaining "weak" cylinders are adjusted through control action. The "weak" cylinders are preferably adjusted first because a weak cylinder creates the perception of exceptionally good performance for the cylinder which follows in the firing order as noted above. Preferably, the crankshaft positions are corrected for tooth machining errors before calculating the engine speed derivatives. Other features, aspects and advantages will become apparent in light of the description to follow.

BRIEF DESCRIPTION OF THE DRAWINGS

The present invention will now be described by way of example, with reference to the accompanying drawings.

DETAILED DESCRIPTION OF THE PREFERRED EMBODIMENT

Figure 1:
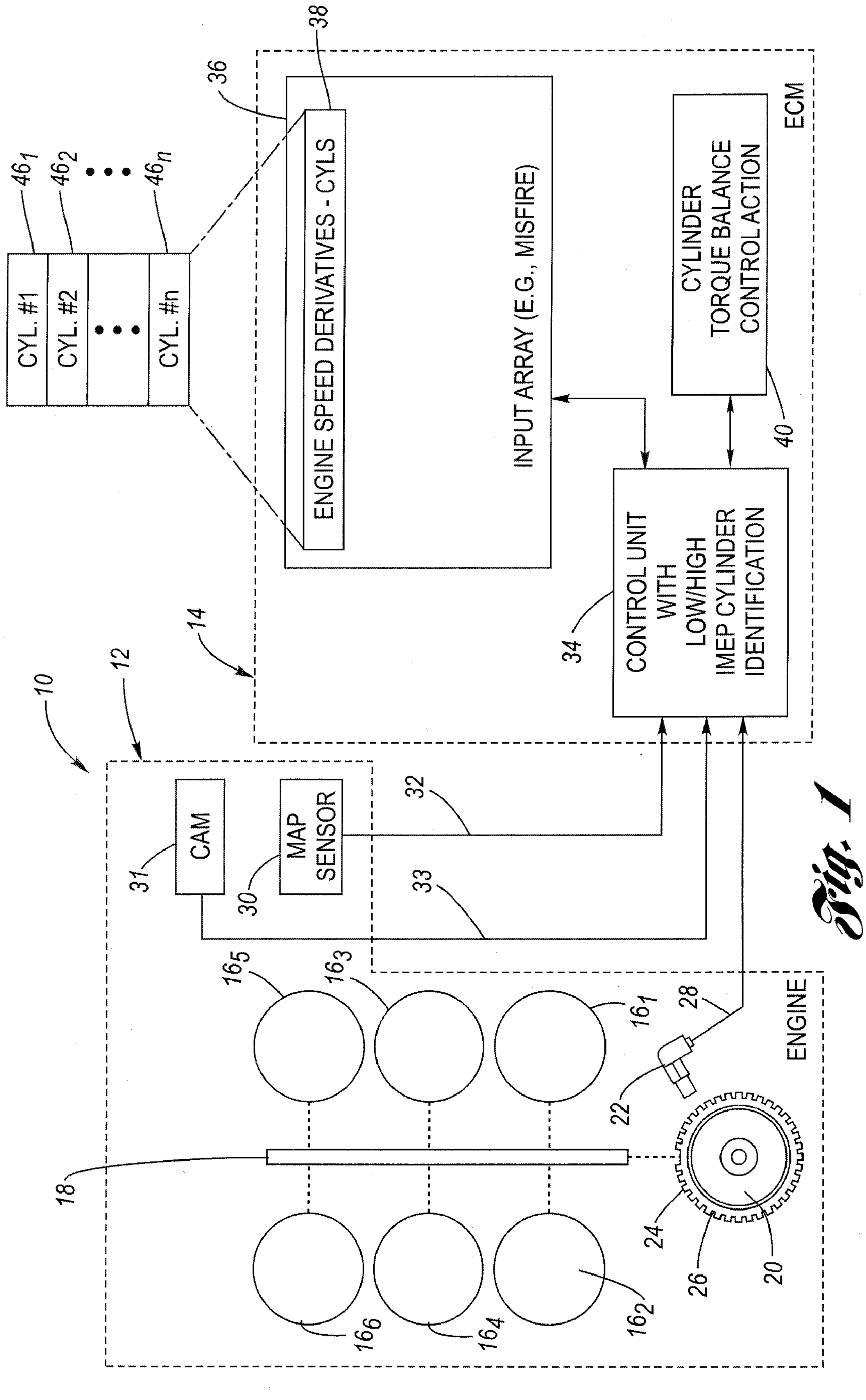
FIG. 1 is a simplified diagrammatic and block diagram view of an internal combustion engine system having a control unit configured to identify low and high IMEP cylinders so as to allow cylinder balancing.

Referring now to the drawings wherein like reference numerals are used to identify identical components in the various views, FIG. 1 shows an internal combustion engine system 10 including an internal combustion engine 12 whose operation is controlled by a programmed, electronic engine control module (ECM) 14 or the like. System 10 is configured, in one embodiment, to already have available real-time engine speed derivative data by virtue of also having misfire detection capability, as known in the art. Of course, misfire detection capability is not required for purposes of the present invention.

The engine 12 includes a plurality of cylinders, illustrated in exemplary fashion as a V-type, six (6) cylinder engine where the cylinders are designated $\mathbf{16}_1$, $\mathbf{16}_2$, $\mathbf{16}_3$, . . . $\mathbf{16}_6$. In one arrangement, for example, the firing order may be designated as cylinders numbers 2-3-4-5-6-1. Of course, other numbering schemes and/or firing orders are possible. Moreover, the present invention is not limited to any particular number of cylinders, i.e., a six cylinder engine as shown is exemplary only, and the invention may be applicable, for example, to a four-cylinder engine or an eight-cylinder engine.

The basic arrangement of the engine 12 is known in the art, and will not be repeated exhaustively herein in detail. However, it should be understood that each cylinder $\mathbf{16}_1$, $\mathbf{16}_2$, $\mathbf{16}_3$, . . . $\mathbf{16}_6$ is equipped with a corresponding piston (not shown), which is connected to a common crankshaft 18, as shown by the dashed-line in FIG. 1. As known, the crankshaft 18 is coupled to a power-train (e.g., transmission and other drive-train components—not shown) in order to provide power to a vehicle (not shown) for movement. Controlled firing of the cylinders causes the various pistons to reciprocate in their respective cylinders, causing the crankshaft to rotate. There is a known relationship between the angular position of the crankshaft 18, and each of the pistons. Each piston, as it reciprocates, moves through various positions in its cylinder, and any particular position is typically expressed as a crankshaft angle with respect to top-dead-center position. In the well-known 4-stroke engine (intake-compression-power-exhaust), two full revolutions (720 degrees) of the crankshaft 18 occur to complete one engine cycle.

FIG. 1 further shows a target wheel 20 and a corresponding sensor 22. The target wheel 20 is configured for rotation with the crankshaft 18. The target wheel 20 includes a plurality of radially-outwardly projecting teeth 24 separated by intervening slots 26. The target wheel 20 and the sensor 22 are, in combination, configured to provided an output signal 28 that is indicative of the angular position of the crankshaft 18. The output signal 28 may be used to derive a crankshaft or an engine speed indicative signal (and derivatives thereof).

In recent years, a commonly employed target wheel is one variant known as a 58× target wheel (i.e., 60-2; 58 teeth spaced around the wheel, spaced as though there were 60 evenly spaced teeth but with two teeth missing). In the illustrated embodiment, the target wheel 20 may be the 58× form target wheel known in the art. This form of a target wheel 20 provides a rising edge in the output signal every 6 degrees, with the exception of the 2-tooth gap, which as known is used as a reference. A speed-based signal, for example, can be formed by determining the speed, or a representative signal, every 6 degrees or multiples of 6 degrees as typically only one edge is used.

FIG. 1 further shows additional components such as an engine load indicative sensor, such as an intake manifold absolute pressure (MAP) sensor 30, and a camshaft position sensor (CAM) 31. The MAP sensor 30 is configured to produce an output signal 32 indicative of manifold absolute pressure. The output signal 32 is indicative of engine load. The CAM sensor 31 is configured to generate a CAM signal 33 that is indicative of which rotation of the engine cycle the crankshaft is on. That is, the crankshaft sensor output signal 28 alone is insufficient to determine whether the crankshaft is on the first 360 degree rotation or on the second 360 degree rotation, which would together define an engine cycle for a four-stroke engine.

The ECM 14 may include a control unit 34 configured with a low/high IMEP cylinder identification capability sufficient for torque control action suitable for cylinder balancing as described herein. The ECM 14 may be characterized by general computing capability, memory storage, input/output (interface) capabilities and the like, all as known in the art. The ECM 14 is configured generally to receive a plurality of input signals representing various operating parameters associated with engine 12, with three such inputs being shown, namely, crankshaft sensor output signal 28, MAP output signal 32 and CAM signal 33. The ECM 14 is configured with various control strategies for producing needed output signals, such as fuel delivery control signals (for fuel injectors—not shown), all in order to control the combustion events, as well as spark timing signals (for respective spark plugs—not shown). In this regard, the ECM 14 may be programmed in accordance with conventional, known air/fuel control strategies and spark timing strategies.

An input array 36 is shown in block form in FIG. 1. The input array 36 includes engine speed derivatives 38. As used herein, as noted above, engine speed derivative simply means a value derived from engine speed indicative data, and is not meant to be limited to only the first order mathematical derivative of engine speed (i.e., acceleration), although the term engine speed derivative includes this meaning. Engine speed derivative thus also includes not only the second order mathematical derivative (i.e., jerk acceleration), but also could include still higher order mathematical derivatives as well, as well as other parameter values derived from engine speed data.

The engine speed derivatives 38 preferably comprises an array of values $\mathbf{46}_1$, $\mathbf{46}_2$, . . . $\mathbf{46}_n$ representing an engine speed derivative associated with a respective one of the cylinders. For example, value $\mathbf{46}_1$ is associated with cylinder #1, value $\mathbf{46}_2$ is associated with cylinder 2, and so on with value $\mathbf{46}_n$ being associated with the last cylinder #n, where n is the total number of cylinders in the engine. As known, while the engine (e.g., crankshaft) will experience a normal, expected amount of acceleration for a normal combustion event in a particular cylinder, the engine, conversely, will experience an abnormal, unexpected deceleration when a partial or total misfire occurs in that cylinder. Alternatively, even during "normal" combustion, manufacturing variations or variations due to wear or passage of time can result in differences in combustion (IMEP) and the resulting acceleration. As described in the Background, conventional misfire detection systems are configured to look for such fluctuations and accordingly are configured to generate various engine speed derivative values for that purpose. Whether or not there is sufficient combustion failure/instability to warrant a "misfire" detection, such engine speed derivative data is nonetheless indicative of the underlying torque production attributable to each cylinder (and by extension the IMEP associated with each cylinder).

In one embodiment, the engine speed derivatives $\mathbf{46}_1$, $\mathbf{46}_2$, . . . $\mathbf{46}_n$ may comprise a respective engine speed first mathematical derivative variation (acceleration) attributable to that cylinder (i.e., either firing or misfiring). In a preferred embodiment, however, the engine speed derivatives $\mathbf{46}_1$, $\mathbf{46}_2$, . . . $\mathbf{46}_n$ may comprise second mathematical derivatives of engine speed, or, a mathematical derivative of an acceleration value (i.e., jerk acceleration) attributable to that cylinder. It is well known how to determine variations in engine speed (and derivatives thereof), particularly contribution attributed to each cylinder, using time markers and its location information received from crankshaft position sensor 22 and camshaft position sensor 31. The engine speed derivatives are produced in a crankshaft timing window which optimizes the match between the cylinder pressure (IMEP) and the resulting crankshaft acceleration.

The cylinder ordering described above is the firing order, not the cylinder number as that term is understood in the art. For example, the first value in the array 36, with a textual name of cylinder #1 and a value $\mathbf{46}_1$, is the first cylinder in the firing order. In this example, however, cylinder #1 may be cylinder number 2 in an engine where the firing order is 2-3-4-5-6-1. It is contemplated that in typical embodiments, a misfire detection system already resident in the ECM 14 will have populated the values $\mathbf{46}_1$, $\mathbf{46}_2$, . . . $\mathbf{46}_n$ in the array 36 during the course of performing its function of misfire detection. Consistent with typical misfire detection systems, preferably, the constituent values $\mathbf{46}_1$, $\mathbf{46}_2$, . . . $\mathbf{46}_n$ of the input array 36 are updated once each combustion event. In other words, the engine speed derivatives are produced in a crankshaft timing window, thus, the identified weakest cylinder will be subject of the controller's 34 action at the end of each individual combustion cycle. Also, it should be understood that the ECM 14 may be configured to produce such engine speed derivative values independent of any misfire detection system.

With continued attention to FIG. 1, the invention uses the engine speed derivatives (e.g., crankshaft acceleration measures) to determine the weakest/strongest cylinders, while below the misfire detection threshold. Generally, according to various strategies outlined in more detail below, torque (IMEP) is increased for the "weakest" cylinders and torque (IMEP) is decreased for the "strongest" cylinders so as to reduce a torque (IMEP) imbalance between them. This control action is designated generally by block 40 in FIG. 1. A torque controller, conventionally included as a programmed feature in the control unit 34 of the engine control module (ECM) 14 may act with respect to the "weak" cylinders and via block 40 to increase torque by any one or more conventional approaches, including by adjusting spark advance, by slowing the decay of fuel control on cold start, by adding fuel to that cylinder (i.e., a richer Air/Fuel ratio), by decreasing dilution (i.e., by decreasing exhaust gas recirculation flow), by adjusting air flow or by other ways known in the art. Likewise, by analogy, the torque controller, may act with respect to the "strong" cylinders and via block 40, to decrease torque by any one or more conventional approaches, including by adjusting spark retard, by increasing the decay of fuel control on cold start, by reducing fuel to that cylinder (i.e., a leaner Air/Fuel ratio), by increasing dilution (i.e., by increasing exhaust gas recirculation flow), by adjusting air flow or by other ways known in the art. With this general overview, a method of the invention will now be described.

Figure 2:
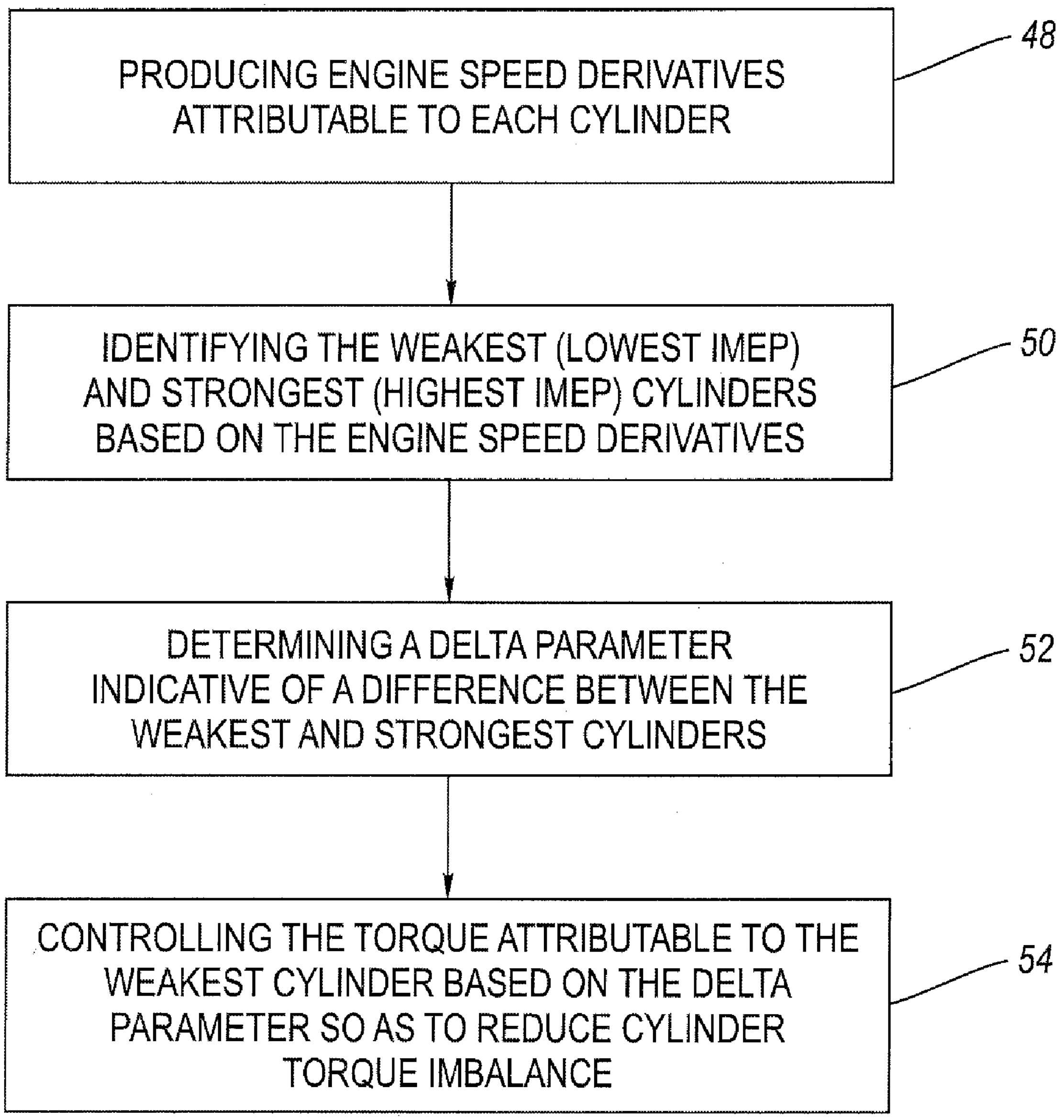
FIG. 2 is a flowchart showing a method for low/high IMEP cylinder identification, identifying low and high IMEP cylinders and cylinder balancing, according to the invention.

FIG. 2 is a simplified flowchart showing the method according to the invention. The method begins in step 48.

Step 48 involves producing a respective engine speed derivative value attributable to each cylinder. This has been described above. The method proceeds to step 50.

Step 50 involves identifying the "weakest" (lowest IMEP) and "strongest" (highest IMEP) cylinders based on the engine speed derivative values. In a preferred embodiment, the "weakest" cylinder is identified by the cycle average of MAX (CYL#1, CYL#2, CYL#3, . . . , CYL#n) over N cycles (the maximum jerk acceleration indicates here the recovery from weak combustion to normal combustion), where N equals the number of cycles (and is equal to or larger than 1) used in the running average, where CYL#1, CYL#2, . . . , CYL#n correspond to the engine speed derivative values $\mathbf{46}_1$, $\mathbf{46}_2$, . . . $\mathbf{46}_n$, specifically corresponding to a time period between crankshaft reference points for the cylinders in the engine, in firing order, and where n is the number of cylinders. Likewise, in the preferred embodiment, the "strongest" cylinder is identified by the cycle average of MIN(CYL#1, CYL#2, CYL#3, . . . , CYL#n) over N cycles, where N equals the number of cycles used in the running average, where CYL#1, CYL#2, . . . , CYL#n correspond to the engine speed derivative values $\mathbf{46}_1$, $\mathbf{46}_2$, . . . $\mathbf{46}_n$, specifically corresponding to a time period between crankshaft reference points for the cylinders in the engine, in firing order, and where n is the number of cylinders. In a constructed embodiment, the "weakest" and "strongest" cylinders have been observed to emerge on a consistent basis after a predetermined number of combustion cycles for a given engine speed (rpm), typically, at the controller's action initiation, between about 10 and 30 cycles at idle, sampled at 3× per crankshaft rotation. Once the controller's action is initiated, at steady state engine conditions, one combustion cycle suffice for the update of the identification of the weakest cylinder.

It should be understood that in embodiments where some other engine speed derivatives are utilized, the "weakest" cylinder may be determined as a MIN function and the "strongest" cylinder may be determined as a MAX function of such engine speed derivatives. Other variations are possible. The method then proceeds to step 52, which is not necessary but improves the gain of the control loop.

Step 52 involves determining a delta parameter indicative of a difference between the "weakest" cylinder and the "strongest" cylinder. In one embodiment, the delta parameter is determined as follows:

$$\text{Delta}=CYL\#_{weakest}-CYL\#_{strongest},$$

Where=CYL$\#_{weakest}$ is the engine speed derivative (e.g., fluctuation is time period, fluctuation in crankshaft acceleration, etc.) for the identified "weakest" cylinder; and CYL$\#_{stongest}$, is the engine speed derivative (e.g., fluctuation in crankshaft angular speed, fluctuation in crankshaft acceleration, etc.) for the identified "strongest" cylinder.

In one embodiment, the delta parameter is calculated as a function of not only (i) crankshaft acceleration, the first mathematical derivative of speed, but also (ii) the mathematical derivative of acceleration (i.e., jerk acceleration). Also, in constructed embodiments, the crankshaft positions are corrected for tooth errors before calculating these values. Note that the way in which the delta parameter is computed takes advantage of the stronger cylinder shadow effect described above for providing an improved signal. Therefore, as was stated earlier, is a desirable but not necessary step in the detection of the weakest cylinder. The method then proceeds to step 54.

In step 54, the method involves controlling the torque attributable to either one of the "weakest" or "strongest" cylinder (preferably the "weakest" cylinder—more below) based on the delta parameter so as to reduce a cylinder torque imbalance.

Figures 3A, 3B:
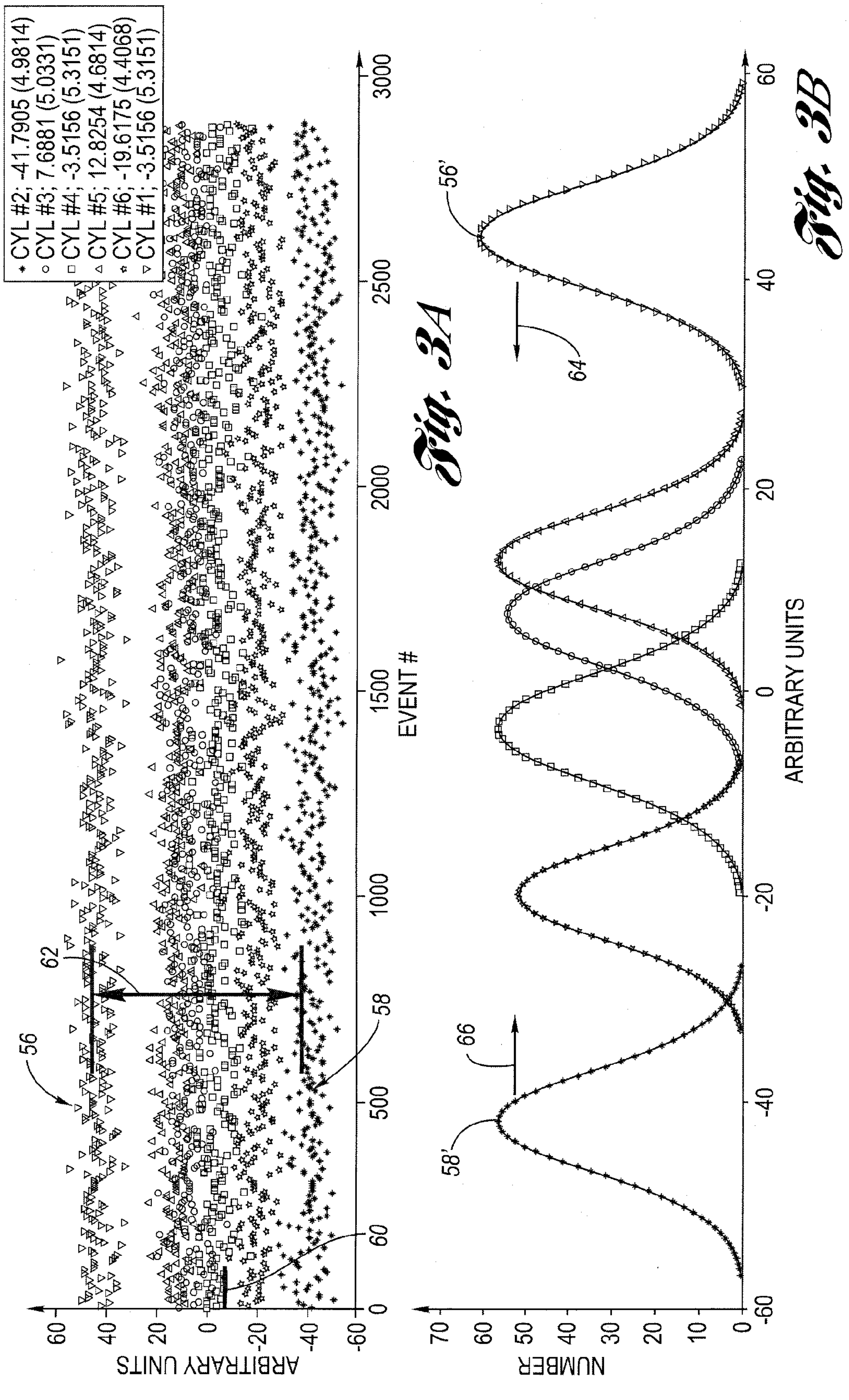
FIG. 3A is a diagram plotting engine speed derivative values on a per-cylinder basis.
FIG. 3B is a diagram showing distribution curves, on a per-cylinder basis, of the engine speed derivative values in FIG. 3A.

FIG. 3A is a diagram showing engine speed derivative values (Y-axis) versus the number of combustion events (X-axis). In particular, for purposes of description, the engine speed derivative values on the Y-axis are plotted on a cylinder-by-cylinder basis. The data reflects an engine cylinder firing order of 2-3-4-5-6-1. In FIG. 3A, the uppermost collection of data points, designated by reference numeral 56, originate with cylinder #1 (the last in the firing order) and is considered to be the "weakest" cylinder. That is, the engine speed derivative values on the Y-axis correspond to reference time periods, so that a weak cylinder (lowest IMEP) will accelerate the crankshaft the slowest, resulting in increased time periods between crankshaft reference points (and hence the largest values on the diagram). The lowermost collection of data points, designated by reference numeral 58, originate with cylinder #2 (the first in the firing order) and is considered to be the "strongest" cylinder. The statistical mean of the engine speed derivative values is also shown by reference number 60. The delta parameter, shown by reference numeral 62, is the difference between the weakest cylinder (its average) and the strongest cylinder (its average).

FIG. 3B shows the same data as in FIG. 3A but in terms of a distribution curve on a cylinder-by-cylinder basis. The distribution of the weakest cylinder #1 is shown as curve 56' and the distribution of the strongest cylinder #2 is shown as curve 58'.

With reference to FIGS. 3A and 3B, the data for the "weakest" (and perhaps misfiring) cylinder is much larger than the remaining data. A "brake action" associated with the "weakest" cylinder creates a perception of exceptionally good performance by the cylinder which follows (as noted above). The delta parameter 62 is determined in such a way so as to minimize this "shadow" effect.

Once the delta parameter is calculated, in a preferred embodiment, control action is initially taken with respect to the identified "weakest" cylinder. With reference to FIG. 3B, the control action, which will be to increase torque (see control block 40 of FIG. 1) attributable to cylinder #1, will tend to move cylinder #1's distribution curve leftward, in the direction indicated by arrow 64, toward the other curves for the other cylinders, to thereby reduce cylinder imbalance. Also, as a consequence, due the lessening of the shadow effect, this control action will also operate to move the "strongest" cylinder's (cylinder #2) distribution curve rightward in the direction of arrow 66, even without any explicit torque adjustment control action as to cylinder #2. According to the preferred strategy, control action is taken to increase the torque attributable to the "weakest" cylinder until it is no longer the "weakest" cylinder, at which time the inventive strategy involves taking control action to increase torque with respect to the next "weakest" cylinder. This control action continues until all "weak" cylinders are balanced, or, in the alternative, a control threshold for spark adjustment and/or fuel adjustment and/or number of cylinders modified have been reached. Thereafter, a similar strategy, this time to decrease torque, is taken with respect to the "strongest" cylinders.

In an alternate embodiment, control action is not immediately taken after the "weakest" and "strongest" cylinders have been identified, but is rather deferred. The results from a number of combustion cycles are stored in a data buffer or the like. Then, after control action is taken, based on the accumulated data in the data buffer (e.g., the average of the individual "delta" parameter values). This embodiment may result in less aggressive control action due to the averaging."

Misfire indicators (i.e., engine speed derivative values) for the cylinders during "normal" operation (not shown) may be relatively closely clustered, unlike FIG. 3A. Changes in engine speed and load may shift the identification of the 'weakest" cylinder while the identification of the "strongest" cylinder may remain the same. In this scenario, use of the "strongest" cylinder in determining the delta parameter increases reliability, since its magnitude is primarily due to the weak cylinder shadow effect described above. Once the "weakest" cylinders have been balanced with appropriate control action, there is a higher balancing effectiveness of the control action on the "strongest" cylinders.

The control unit 34 is configured with a low/high IMEP cylinder identification function, suitable for use in control action to effect cylinder balancing, as described herein. It should be understood that the functional and other descriptions and accompanying illustrations contained herein will enable one of ordinary skill in the art to practice the inventions herein without undue experimentation. It is contemplated that the invention will preferably be practiced through programmed operation (i.e., execution of software computer programs) of the control unit 34.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

The invention claimed is:

1. A method operating a multi-cylinder internal combustion engine system, comprising the steps of:

producing an input array including an engine speed derivative for each cylinder;

identifying a first one of said cylinders having the lowest Indicated Mean Effective Pressure (IMEP) and a second one of said cylinders having the largest IMEP based on said input array;

determining a delta parameter indicative of a difference between the engine speed derivatives associated with the identified first and second ones of the plurality of cylinders; and controlling the torque attributable to the first, lowest IMEP one of the plurality of cylinders based on the delta parameter so as to reduce said difference, thereby reducing cylinder torque imbalance.

2. A method operating a multi-cylinder internal combustion engine system, comprising the steps of:

producing an input array including an engine speed derivative for each cylinder; and identifying a first one of said cylinders having the lowest Indicated Mean Effective Pressure (IMEP) and a second one of said cylinders having the largest IMEP based on said input array.

3. The method of claim 2 further including the steps of:

determining a delta parameter indicative of a difference between the engine speed derivatives associated with the identified first and second ones of the cylinders;

controlling the engine based on the delta parameter so as to reduce said difference.

4. The method of claim 3 wherein said step of controlling the engine includes the sub-step of:

adjusting torque attributable to the first, lowest IMEP one of the cylinders in accordance with the delta parameter.

5. The method of claim 4 wherein said torque adjusting step includes the sub-step of controlling one of a fueling characteristic, spark timing characteristic, a dilution characteristic, a camshaft phaser advance angle characteristic and an airflow characteristic associated with the first, lowest IMEP one of the cylinders.

6. The method of claim 4 wherein said step of controlling the engine includes the substep of:

adjusting torque attributable to the second, highest IMEP one of the cylinders in accordance with the delta parameter.

7. The method of claim 6 wherein said adjusting torque of the second, highest IMEP one of the cylinders includes the sub-step of controlling one of a fueling characteristic, spark timing characteristic, dilution characteristic, a camshaft phaser advance angle characteristic and an airflow characteristic associated with the second, highest IMEP one of the cylinders.

8. The method of claim 7 said adjusting steps are performed each combustion cycle.

9. The method of claim 7 further including the step of storing, for a plurality of combustion cycles, results of said identifying step in a data buffer; wherein said adjusting steps are performed after said plurality of combustion cycles based on said stored results.

10. The method of claim 2 wherein the engine speed derivatives are updated each combustion cycle of the engine.

11. The method of claim 2 wherein the engine speed derivatives correspond to time intervals between predetermined crankshaft reference points.

12. The method of claim 11 wherein said step of identifying the first, lowest IMEP one of the cylinders includes the sub-step of determining the maximum value of the plurality of values in the input array, and said step of identifying the second, highest IMEP one of the cylinders includes the sub-step of determining the minimum value of the plurality of values in the input array.

13. The method of claim 2 wherein the engine speed derivatives correspond to at least one of crankshaft acceleration values and jerk acceleration values.

14. The method of claim 13 wherein said step of identifying the first, lowest IMEP one of the cylinders includes the sub-step of determining the minimum value of the plurality of values in the input array, and said step of identifying the second, highest IMEP one of the cylinders includes the sub-step of determining the maximum value of the plurality of values in the input array.

* * * * *